Sept. 27, 1932.     W. WINZENBURG     1,879,864
PORTABLE SOUND FILM BOX
Filed Feb. 15, 1930
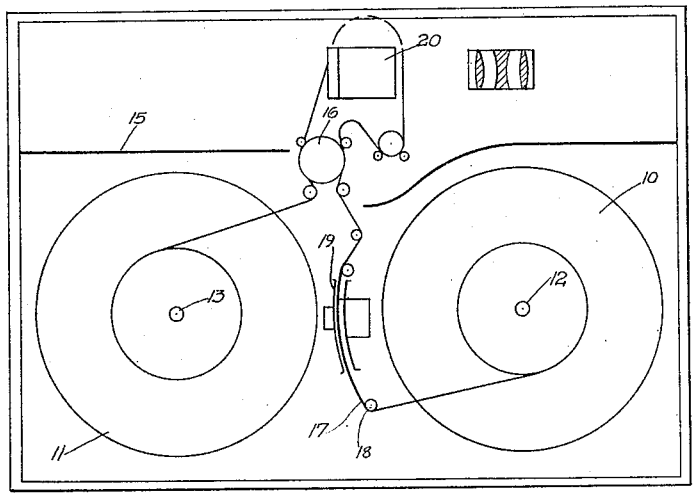
Inventor
Wilhelm Winzenburg
By his Attorney
George C. Heinrichs Patented Sept. 27, 1932

1,879,864

UNITED STATES PATENT OFFICE

WILHELM WINZENBURG, OF DRESDEN-LAUBEGAST, GERMANY, ASSIGNOR TO ZEISS IKON, AKTIENGESELLSCHAFT DRESDEN, OF DRESDEN, GERMANY

PORTABLE SOUND FILM BOX

Application filed February 15, 1930, Serial No. 428,691, and in Germany July 20, 1929.

This invention relates to improvements in cinematographic apparatus for talking or sound pictures, and it is the principal object of my invention to arrange the means for operating the sound film within the space containing the film spools so as to create an apparatus containing in a compact form all the necessary equipment or paraphernalia for the reproduction of a sound film.

Another object of my invention is the provision of a simple and comparatively inexpensive apparatus of this type yet efficient in operation.

A further object of my invention is the provision of a cinematographic apparatus containing all the necessary equipment arranged in a compact form protected against disturbances and damage.

These and other objects and advantages of my invention will become more fully apparent as the description thereof proceeds, and will then be specifically defined in the appended claim.

In the accompanying drawing, forming a material part of this disclosure:

The single figure illustrates a portable or box cinematographic apparatus for talking or sound pictures constructed according to my invention.

As illustrated, the film spools 10 and 11 are arranged in juxtaposition on their spindles 12 and 13 respectively suitably provided within the box or container 14 and are separated from the optical equipment by a partition wall 15. Between spools 10 and 11 the film band 17 is guided over suitable guide rollers 18 between the usual guides 19 and is illuminated from a source of light 19' sending its bunched rays through a slit and optical system in the usual well known manner in such apparatus upon the sound film. A photo-electric cell or other cell 20 sensitive to light is arranged in the space behind the partition 15 in the path of the light from source 19' and is adapted to transform the variations in the film illumination into electric oscillations which are then transmitted through a condenser or intensifier to a loud speaker not shown as they do not form part of my invention, the photo-electric cell being connected for this purpose to an electric circuit.

The operation of my device will be entirely clear from the above description by simultaneous inspection of the drawing, and it will be evident that I have produced a cinematographic apparatus in a novel compact form.

It will be understood that I have described and shown the preferred form of my device only as an example of the many possible ways to practically construct the same, and that I may make such changes therein as come within the scope of the appended claim without departure from the spirit of my invention and the principles involved.

Having thus described my invention, what I claim as new and desire to secure by Letters Patent is:

In an apparatus of the character described, a container, a partition dividing said container into a main compartment and an auxiliary compartment, said partition being formed with a passage intermediate its ends establishing communication between the compartments, a source of light, a pair of film spools rotatably mounted in the main compartment in juxtaposition with the source of light, a photo-cell in the auxiliary compartment in the path of light from the source of light, film guides in the main compartment between said spools, and rollers in the main and auxiliary compartments for guiding a strip of film from one spool to the other, the film during such movement being engaged with the guides and rollers and passing into and out of the auxiliary compartment through the passage in said partition and about the photo-electric cell.

Signed at Dresden, Germany, in the county of Saxony and State of Germany, this 21st day of January, A. D. 1930.

WILHELM WINZENBURG.